(12) United States Patent
Kim et al.

(10) Patent No.: US 12,548,788 B2
(45) Date of Patent: Feb. 10, 2026

(54) CARTRIDGE OF HUMIDIFIER FOR FUEL CELL AND HUMIDIFIER FOR FUEL CELL

(71) Applicant: KOLON INDUSTRIES, INC., Seoul (KR)

(72) Inventors: Do Woo Kim, Seoul (KR); Hyoung Mo Yang, Seoul (KR); Jung Kun Her, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 462 days.

(21) Appl. No.: 18/248,748

(22) PCT Filed: Nov. 11, 2021

(86) PCT No.: PCT/KR2021/016392
§ 371 (c)(1),
(2) Date: Apr. 12, 2023

(87) PCT Pub. No.: WO2022/139172
PCT Pub. Date: Jun. 30, 2022

(65) Prior Publication Data
US 2023/0411649 A1     Dec. 21, 2023

(30) Foreign Application Priority Data

Dec. 21, 2020    (KR) .................. 10-2020-0179261

(51) Int. Cl.
*H01M 8/04119*     (2016.01)
*B01D 63/02*         (2006.01)

(52) U.S. Cl.
CPC ...... *H01M 8/04149* (2013.01); *B01D 63/031* (2022.08); *H01M 8/04141* (2013.01)

(58) Field of Classification Search
CPC ............ B01D 63/031; H01M 8/04141; H01M 8/04149
See application file for complete search history.

(56) References Cited

U.S. PATENT DOCUMENTS 10,658,688 B2     5/2020   Shinozaki
10,862,145 B2 *   12/2020   Oh ................... H01M 8/04149
(Continued)

FOREIGN PATENT DOCUMENTS

CN         111193049 A    *   5/2020
DE    102013004839 A1       1/2014
(Continued)

OTHER PUBLICATIONS

English Machine Translation of CN 111193049 A (Year: 2020).*
(Continued)

*Primary Examiner* — Charles S Bushey
(74) *Attorney, Agent, or Firm* — Harvest IP Law, LLP

(57) ABSTRACT

The present invention relates to a cartridge of a humidifier for a fuel cell for humidifying dry gas supplied from the outside by using wet gas discharged from a fuel cell stack, and a humidifier for a fuel cell, the cartridge including: an inner case having openings at each end thereof and containing a plurality of hollow fiber membranes; a gas inlet and a gas outlet formed in the inner case; and an adjustment cover movably coupled to the inner case, and adjusting at least one of an inflow area through which the wet gas or the dry gas flows through the gas inlet, and an outflow area through which the wet gas or the dry gas flows out through the gas outlet.

12 Claims, 9 Drawing Sheets

(56) References Cited

U.S. PATENT DOCUMENTS

| | | | | |
|---|---|---|---|---|
| 11,335,925 | B2* | 5/2022 | An | H01M 8/04291 |
| 11,641,021 | B2* | 5/2023 | Lee | H01M 8/0485 |
| | | | | 261/44.5 |
| 11,646,431 | B2* | 5/2023 | Kim | H01M 8/04104 |
| | | | | 261/105 |
| 2008/0237902 | A1* | 10/2008 | Nagumo | B01D 53/22 |
| | | | | 261/104 |
| 2015/0190013 | A1* | 7/2015 | Collera | A47J 37/0786 |
| | | | | 99/341 |
| 2020/0153004 | A1* | 5/2020 | Oh | H01M 8/04149 |

FOREIGN PATENT DOCUMENTS

| | | |
|---|---|---|
| JP | 2003065566 A | 3/2003 |
| JP | 2008256225 A | 10/2008 |
| JP | 2010146809 A | 7/2010 |
| JP | 2010146810 A | 7/2010 |
| KR | 20160073524 A | 6/2016 |
| KR | 20180066418 A | 6/2018 |
| KR | 20190138528 A | 12/2019 |
| KR | 20190139656 A | 12/2019 |
| KR | 20200122211 A | 10/2020 |
| WO | 2010/055775 A1 | 5/2010 |

OTHER PUBLICATIONS

The office action dated May 12, 2025 related to the corresponding European Patent application.
Diabolicalangle: "Locking Mechanism.avi", Apr. 28, 2011 (Apr. 28, 2011), XP093273967, Retrieved from the Internet: URL:https://www.youtube.com/watch?v=zdJrkC_rGxs.
The search report dated Sep. 16, 2024 related to the corresponding European Patent application.
1 The office action dated Mar. 28, 2024 related to the corresponding Korean Patent application.
Office Action From European Patent Office, Dated Oct. 28, 2025.

* cited by examiner

CARTRIDGE OF HUMIDIFIER FOR FUEL CELL AND HUMIDIFIER FOR FUEL CELL

CROSS REFERENCE TO RELATED APPLICATION(S)

This application is a National Stage of International Application No. PCT/KR2021/016392 filed Nov. 11, 2021, claiming priority based on Korean Patent Application No. 10-2020-0179261 filed Dec. 21, 2020, the disclosures of which are incorporated herein by reference in their entireties.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 120 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 1/1b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method. The fixing layers 113, in which ends of the hollow fiber membranes 112 are potted, and resin layers 114 provided between the fixing layers 113 and the mid-case 111 isolate inner spaces of the caps 120 from an inner space of the mid-case 111. Similarly to the fixing layers 113, each of the resin layers 114 is generally formed by hardening a liquid polymer, such as liquid polyurethane resin, using a casting method.

Air supplied from the outside flows along hollows of the hollow fiber membranes 112. Off-gas introduced into the mid-case 111 through the off-gas inlet 111a comes into contact with outer surfaces of the hollow fiber membranes 112, and is discharged from the mid-case 111 through the off-gas outlet 1/1b. When the off-gas comes into contact with the outer surfaces of the hollow fiber membranes 112, moisture contained in the off-gas is transmitted through the hollow fiber membranes 112 to humidify air flowing along the hollows of the hollow fiber membranes 112.

In recent years, fuel cells have been used in various places of use, whereby it is also required for a humidifier for fuel cells to have various kinds of humidification performance. Consequently, there is an urgent need to develop a humidifier for fuel cells capable of having various kinds of humidification performance required for the fuel cells.

DISCLOSURE

Technical Problem

The present disclosure has been made in view of the above problems, and it is an object of the present disclosure to provide a cartridge of a humidifier for fuel cells and a humidifier for fuel cells capable of having various kinds of humidification performance required for the fuel cells.

Technical Solution

In order to accomplish the above object, the present disclosure may include the following constructions.

A humidifier for fuel cells according to the present disclosure may include a humidifying module configured to humidify dry gas supplied from outside using wet gas discharged from a fuel cell stack, a first cap coupled to one end of the humidifying module, and a second cap coupled to the other end of the humidifying module. The humidifying module may include a mid-case open at opposite ends thereof and at least one cartridge disposed in the mid-case, the cartridge including a plurality of hollow fiber membranes. The cartridge may include an inner case having openings formed in ends thereof, the inner case being configured to receive the plurality of hollow fiber membranes. The inner case may include a gas inlet configured to allow wet gas or dry gas to be introduced therethrough and a gas outlet configured to allow wet gas or dry gas to be discharged therethrough. An adjustment cover configured to adjust at least one of an inflow area, which is the area of wet gas or dry gas introduced through the gas inlet, and an outflow area, which is the area of wet gas or dry gas discharged through the gas outlet, may be movably coupled to the inner case.

A cartridge of a humidifier for fuel cells according to the present disclosure is configured to humidify dry gas supplied from outside using wet gas discharged from a fuel cell stack. The cartridge of the humidifier for fuel cells according to the present disclosure may include an inner case having openings formed in ends thereof, the inner case being configured to receive a plurality of hollow fiber membranes, a gas inlet and a gas outlet formed in the inner case, and an adjustment cover movably coupled to the inner case, the adjustment cover being configured to adjust at least one of an inflow area, which is the area of wet gas or dry gas introduced through the gas inlet, and an outflow area, which is the area of wet gas or dry gas discharged through the gas outlet.

Advantageous Effects

The present disclosure is implemented so as to adjust at least one of an inflow area, which is the area of wet gas or dry gas that is introduced, and an outflow area, which is the area of wet gas or dry gas that is discharged. Consequently, the present disclosure is implemented so as to have various kinds of humidification performance, whereby it is possible to improve versatility, with which the present disclosure is applicable to fuel cells used in various places of use.

BEST MODE

Figure 9:
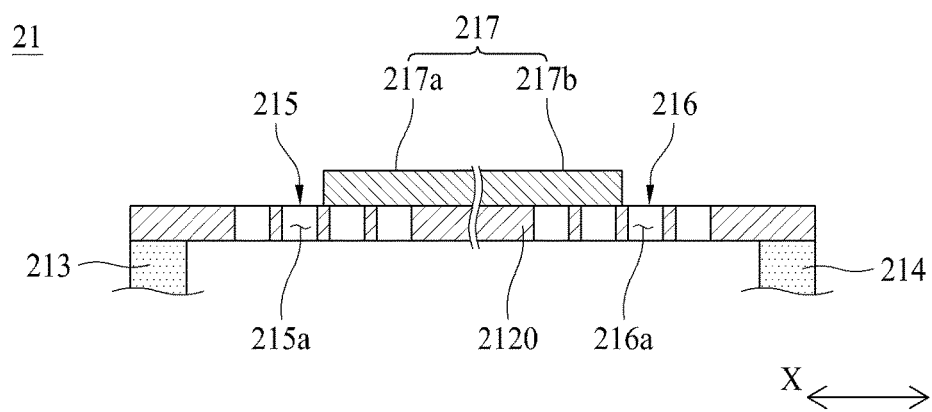
FIG. 9 is a schematic side sectional view showing the cartridge of the humidifier for fuel cells according to the present disclosure, taken along line III-III of FIG. 8.

Hereinafter, an embodiment of a humidifier for fuel cells according to the present disclosure will be described in detail with reference to the accompanying drawings. A cartridge of a humidifier for fuel cells according to the present disclosure may be included in a humidifier for fuel cells according to the present disclosure, and therefore the cartridge of the humidifier for fuel cells according to the present disclosure will also be described while the embodiment of the humidifier for fuel cells according to the present disclosure is described. Meanwhile, in FIGS. 7 and 9, two parallel curved lines are omission lines.

Figure 1:
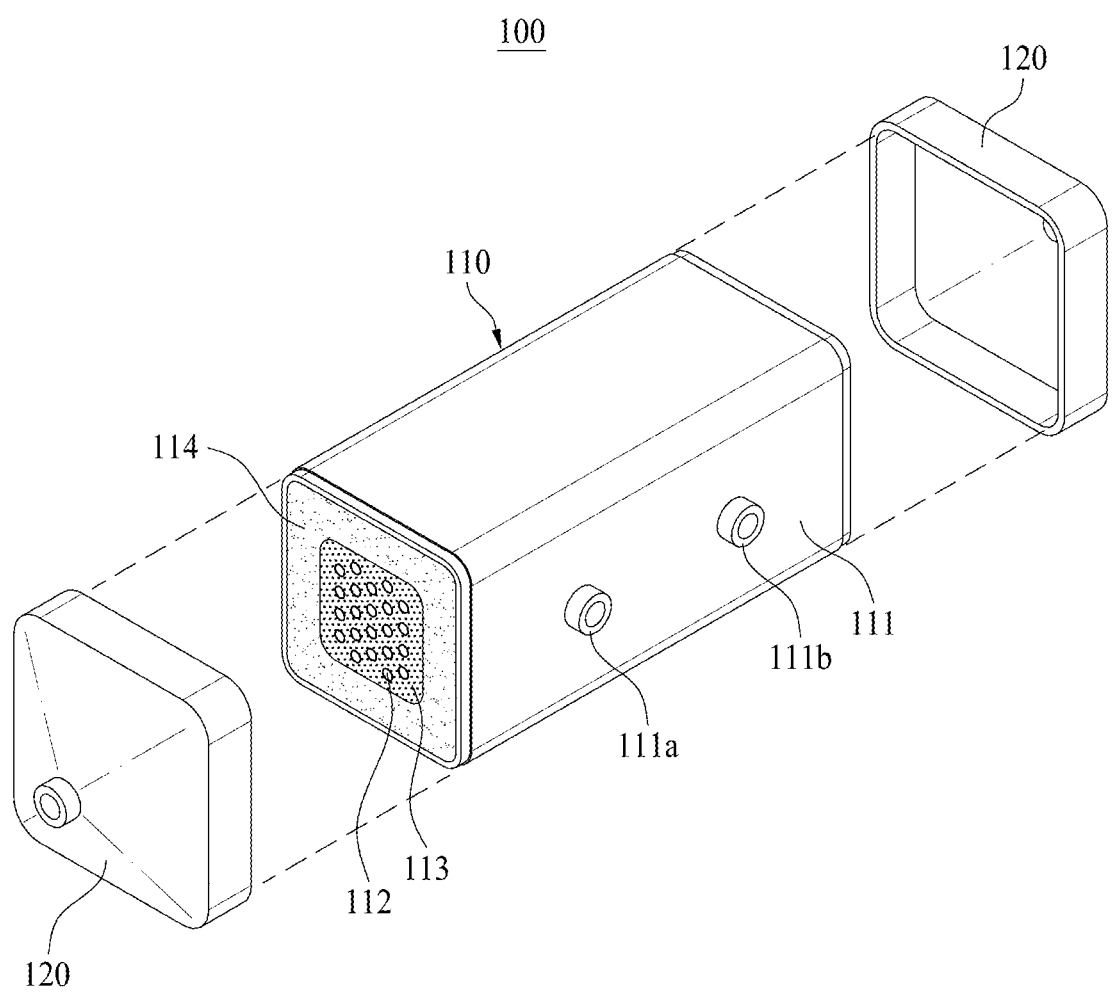
FIG. 1 is a schematic exploded perspective view of a conventional humidifier for fuel cells.
Figure 2:
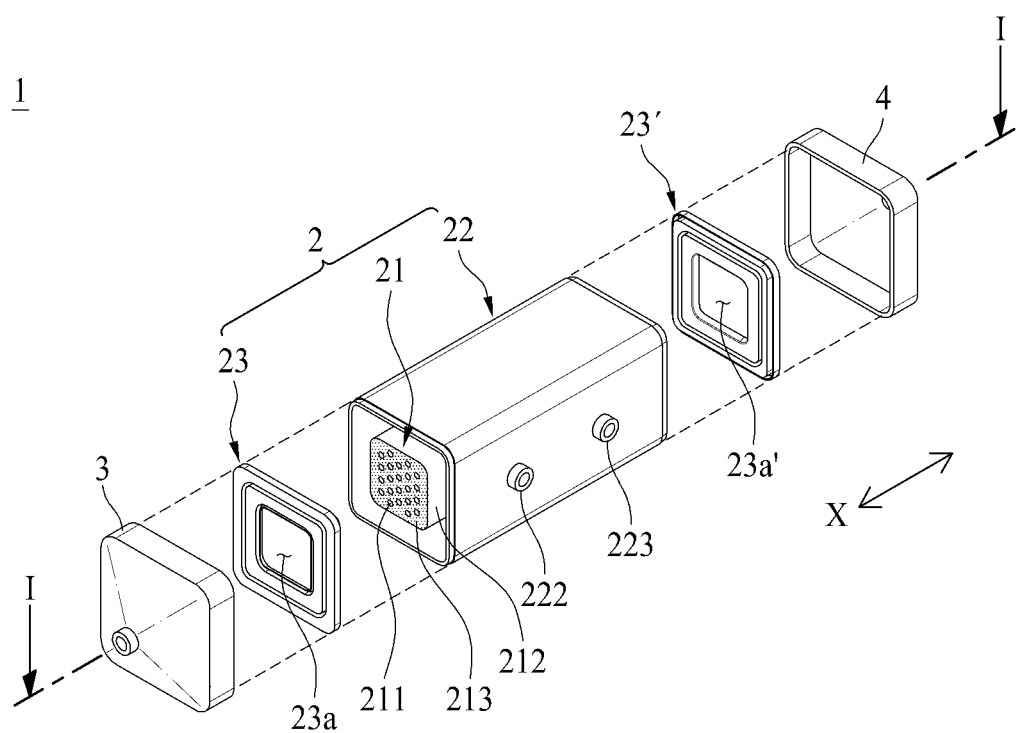
FIG. 2 is a schematic exploded perspective view of a humidifier for fuel cells according to the present disclosure.
Figure 3:
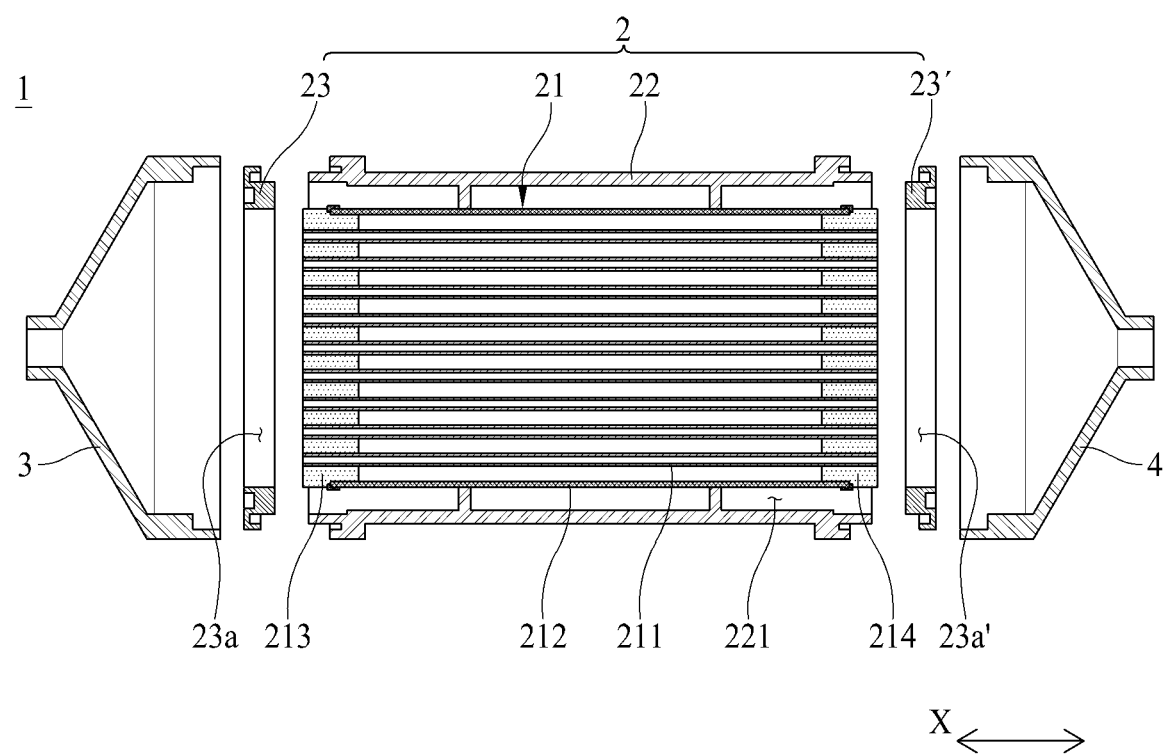
FIG. 3 is a schematic exploded sectional view showing the humidifier for fuel cells according to the present disclosure, taken along line I-I of FIG. 2.
Figure 4:
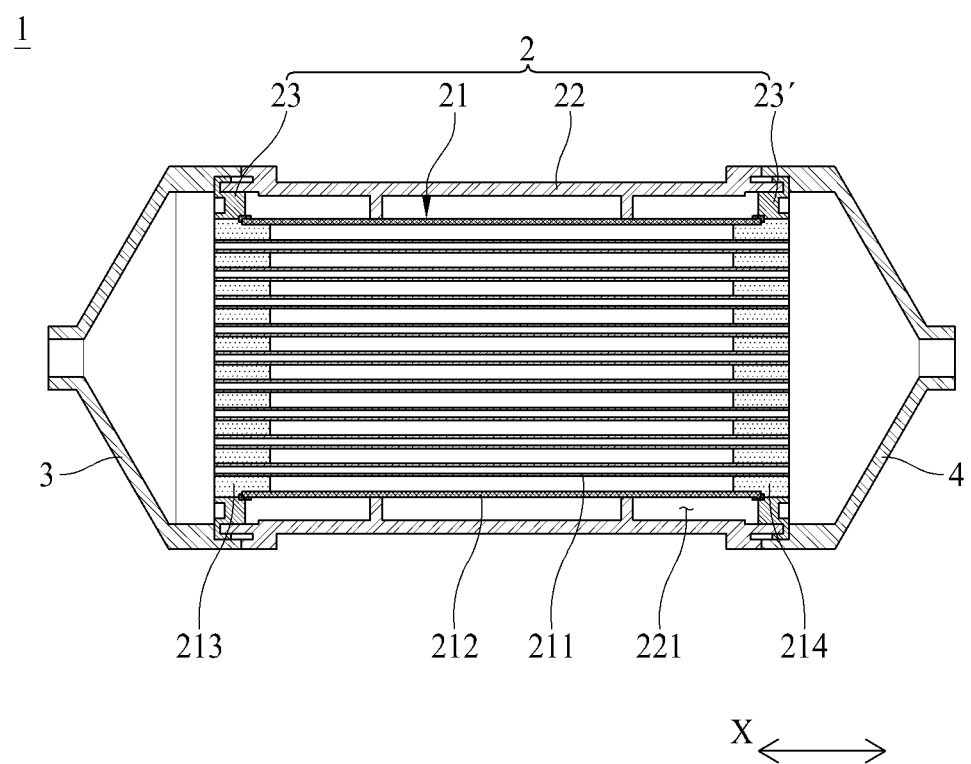
FIG. 4 is a schematic coupled sectional view showing the humidifier for fuel cells according to the present disclosure, taken along line I-I of FIG. 2.

Referring to FIGS. 2 to 4, a humidifier 1 for fuel cells according to the present disclosure is configured to humidify dry gas supplied from the outside using wet gas discharged from a fuel cell stack (not shown). The dry gas may be fuel gas or air. The dry gas may be humidified by the wet gas and may then be supplied to the fuel cell stack. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 2 to 4, the humidifying module 2 humidifies dry gas supplied from the outside. The first cap 3 may be coupled to one end of the humidifying module 2. The second cap 4 may be coupled to the other end of the humidifying module 2. The first cap 3 may transmit dry gas to the humidifying module 2. In this case, the second cap 4 may transmit dry gas humidified by wet gas in the humidifying module 2 to the fuel cell stack. The first cap 3 may transmit wet gas to the humidifying module 2. In this case, the second cap 4 may discharge wet gas to the outside after dry gas is humidified in the humidifying module 2.

The humidifying module 2 includes at least one cartridge 21 and a mid-case 22.

The cartridge 21 is disposed in the mid-case 22, and includes a plurality of hollow fiber membranes 211. The hollow fiber membranes 211 may be coupled to the cartridge 21 so as to be modularized. Consequently, the hollow fiber membranes 211 may be installed in the mid-case 22 through a process of coupling the cartridge 21 to the mid-case 22. In the humidifier 1 for fuel cells according to the present disclosure, therefore, ease in installation, separation, and replacement of the hollow fiber membranes 211 may be improved. The cartridge 21 may be implemented as a cartridge of a humidifier for fuel cells according to the present disclosure.

The cartridge 21 may include an inner case 212.

The inner case 212 has openings formed in ends thereof, and the plurality of hollow fiber membranes 211 is received in the inner case. The hollow fiber membranes 211 may be disposed in the inner case 212 so as to be modularized. The hollow fiber membranes 211 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 21 may include fixing layers 213 and 214.

Ends of the plurality of hollow fiber membranes 211 are potted in the fixing layers 213 and 214, which close the openings of the inner case 212. One side of the plurality of hollow fiber membranes 211 may be fixed by the fixing layer 213, and the other side of the plurality of hollow fiber membranes 211 may be fixed by the fixing layer 214. Each of the fixing layers 213 and 214 may be formed by hardening a liquid resin, such as liquid polyurethane resin, through a casting process. The fixing layers 213 and 214 may fix the ends of the plurality of hollow fiber membranes 211 to the inner case 212.

The fixing layers 213 and 214 may be formed so as not to block the hollows of the plurality of hollow fiber membranes 211. Consequently, dry gas or wet gas supplied from the outside may be supplied to the hollows of the hollow fiber membranes 211 without being disturbed by the fixing layers 213 and 214, and may be discharged from the hollows of the hollow fiber membranes 211 without being disturbed by the fixing layers 213 and 214.

The cartridge 21 is coupled to the mid-case 22. The cartridge 21 may be disposed in the mid-case 22. Opposite ends of the mid-case 22 are open. In this case, a receiving hole 221 may be formed in the mid-case 22. The receiving hole 221 may be formed so as to extend through the mid-case 22 in a first axis direction (X-axis direction).

An inlet 222 and an outlet 223 may be formed at one side of the mid-case 22. The inlet 222 may allow wet gas or dry gas to be introduced into the mid-case 22 therethrough. The outlet 223 may allow wet gas or dry gas to be discharged from the mid-case 22 therethrough. The inlet 222, the outlet 223, and the mid-case 22 may be integrally formed.

The humidifying module 2 may include a plurality of packing members 23 and 23'.

The packing members 23 and 23' hermetically seal between the cartridge 21 and the mid-case 22 in order to prevent direct mixing between dry gas and wet gas. The packing members 23 and 23' may be inserted between the cartridge 21 and the mid-case 22. In this case, the cartridge 21 may be inserted through first through-holes 23a and 23a' formed respectively in the packing members 23 and 23'. The packing members 23 and 23' may be disposed respectively at opposite sides of the cartridge 21. Although not shown, resin layers may be formed respectively at the opposite sides of the cartridge 21 instead of the packing members 23 and 23'. Each of the resin layers may be formed by hardening a liquid polymer, such as liquid polyurethane resin, using a casting method.

Referring to FIGS. 2 to 4, the first cap 3 is coupled to one end of the humidifying module 2. A space between the first cap 3 and the cartridge 21 may be isolated from a space between the cartridge 21 and the mid-case 22 in a hermetically sealed state by the packing member 23 or the resin layer.

Referring to FIGS. 2 to 4, the second cap 4 is coupled to the other end of the humidifying module 2. The second cap 4 may be coupled to the other end of the humidifying module 2 so as to be spaced apart from the first cap 3 in the first axis direction (X-axis direction). A space between the second cap 4 and the cartridge 21 may be isolated from the space between the cartridge 21 and the mid-case 22 in a hermetically sealed state by the packing member 23' or the resin layer.

Here, the humidifier 1 for fuel cells according to the present disclosure may be implemented as follows so as to have various kinds of humidification performance through the cartridge 21.

Figure 5:
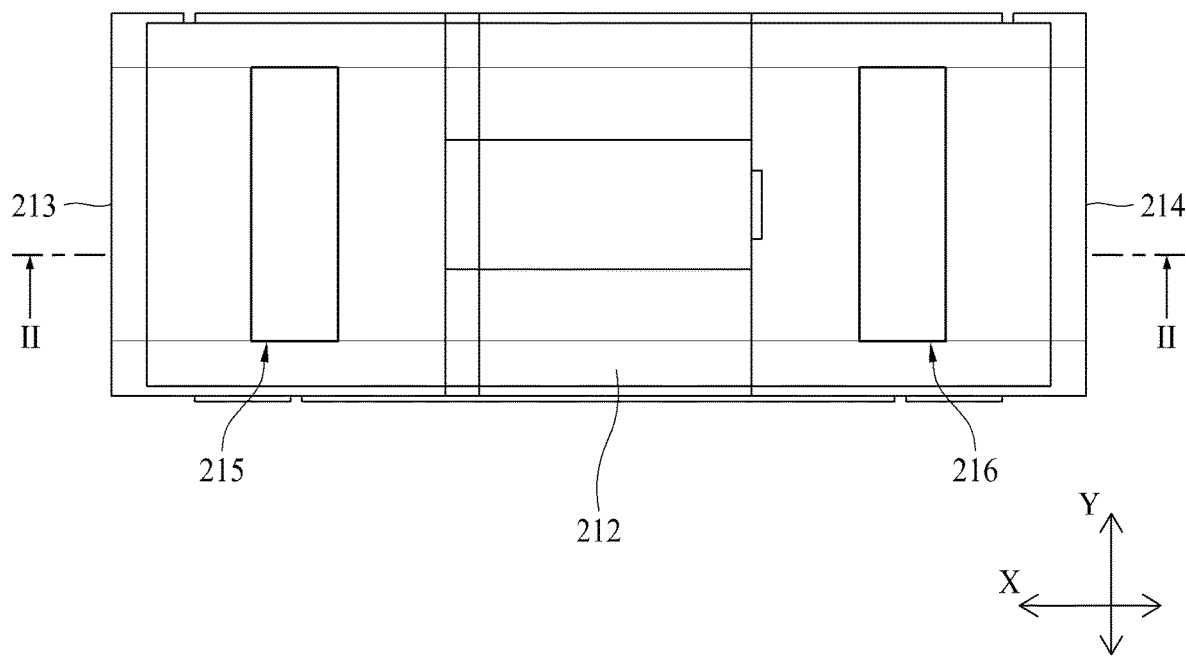
FIGS. 5 and 6 are schematic plan views of a cartridge of a humidifier for fuel cells according to the present disclosure.
Figure 6:
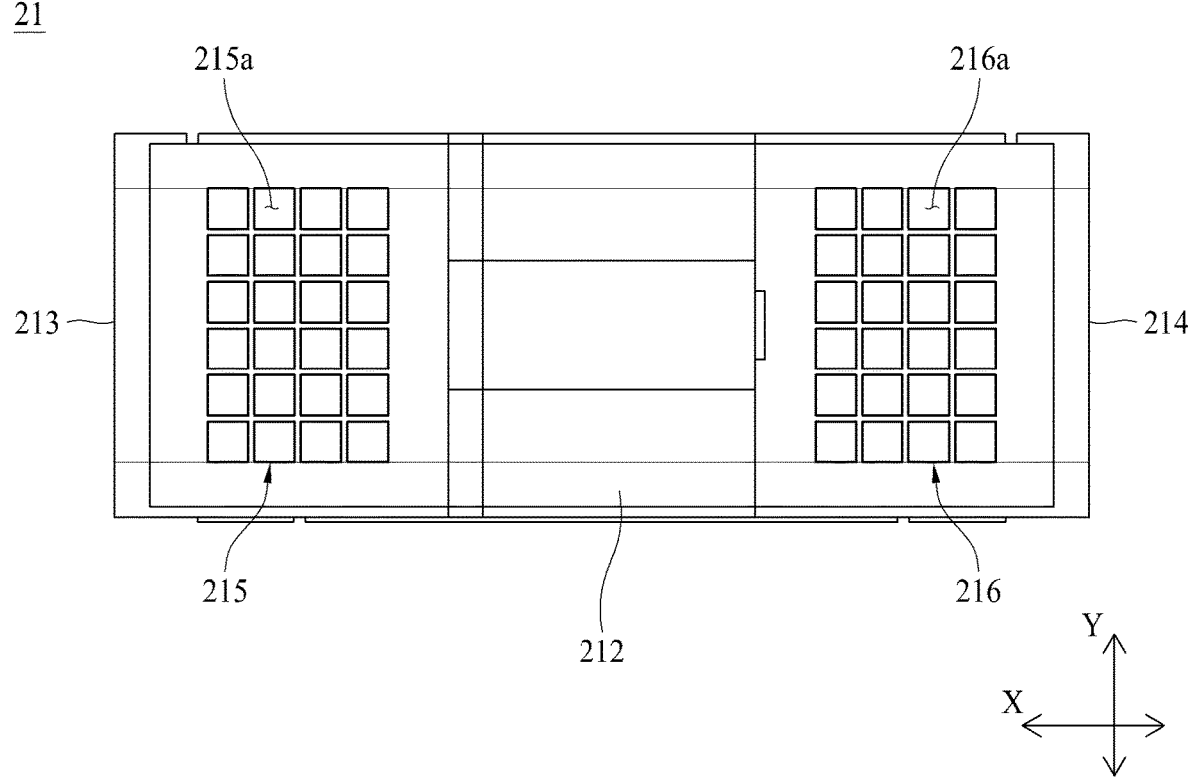
Figure 7:
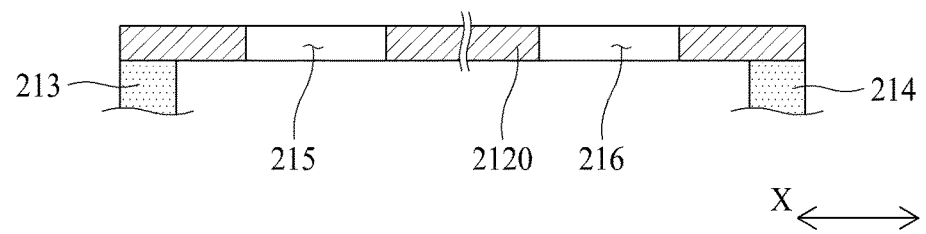
FIG. 7 is a schematic side sectional view showing the cartridge of the humidifier for fuel cells according to the present disclosure, taken along line II-II of FIG. 5.

Referring to FIGS. 5 to 7, the cartridge 21 may include a gas inlet 215 and a gas outlet 216.

The gas inlet 215 is formed in the inner case 212. The gas inlet 215 may be formed at one side 2120 of the inner case 212. Based on FIG. 7, one side 2120 of the inner case 212 may correspond to an upper surface. The gas inlet 215 may allow wet gas or dry gas to be introduced into the inner case 212 therethrough. The gas inlet 215 may be formed through the inner case 212. As shown in FIGS. 5 and 7, the gas inlet 215 may be implemented by one through-hole formed through the inner case 212. As shown in FIG. 6, the gas inlet 215 may be implemented by a plurality of through-holes formed through the inner case 212. In this case, the gas inlet 215 may include a plurality of inflow windows 215a formed through different parts of the inner case 212. The inflow windows 215a may be disposed spaced apart from each other in the first axis direction (X-axis direction) and a second axis direction (Y-axis direction) so as to form a matrix. The second axis direction (Y-axis direction) is an axial direction perpendicular to the first axis direction (X-axis direction).

The gas outlet 216 is formed in the inner case 212. The gas outlet 216 may be formed at one side 2120 of the inner case 212. The gas outlet 216 may allow wet gas or dry gas to be discharged from the inner case 212 therethrough. The gas outlet 216 may be formed through the inner case 212. As shown in FIGS. 5 and 7, the gas outlet 216 may be implemented by one through-hole formed through the inner case 212. As shown in FIG. 6, the gas outlet 216 may be implemented by a plurality of through-holes formed through the inner case 212. In this case, the gas outlet 216 may include a plurality of outflow windows 216a formed through different parts of the inner case 212. The outflow windows 216a may be disposed spaced apart from each other in the first axis direction (X-axis direction) and the second axis direction (Y-axis direction) so as to form a matrix. The gas outlet 216 and the gas inlet 215 may be disposed spaced apart from each other in the first axis direction (X-axis direction).

When wet gas flows through the gas outlet 216 and the gas inlet 215, the wet gas may be supplied to a space between an inner surface of the mid-case 22 and an outer surface of the inner case 212 through the inlet 222, may be supplied into the inner case 212 through the gas inlet 215, and may come into contact with the outer surfaces of the hollow fiber membranes 211. During this process, moisture contained in the wet gas may be transmitted through the hollow fiber membranes 211 to humidify dry gas flowing along the hollows of the hollow fiber membranes 211. The humidified dry gas may be discharged from the hollow fiber membranes 211, and may then be supplied to the fuel cell stack through the second cap 4. After humidifying the dry gas, the wet gas may be discharged to the space between the outer surface of the inner case 212 and the inner surface of the mid-case 22 through the gas outlet 216, and may be discharged from the mid-case 22 through the outlet 223. The inlet 222 may be connected to the fuel cell stack such that wet gas is supplied thereto. Wet gas may be off-gas discharged from the fuel cell stack.

When dry gas flows through the gas outlet 216 and the gas inlet 215, the dry gas may be supplied to the space between the inner surface of the mid-case 22 and the outer surface of the inner case 212 through the inlet 222, may be supplied into the inner case 212 through the gas inlet 215, and may come into contact with the outer surface of the hollow fiber membranes 211. During this process, moisture in wet gas flowing along the hollows of the hollow fiber membranes 211 may be transmitted through the hollow fiber membranes 211 to humidify the dry gas introduced into the inner case 212. The humidified dry gas may be discharged to the space between the outer surface of the inner case 212 and the inner surface of the mid-case 22 through the gas outlet 216, may be discharged from the mid-case 22 through the outlet 223, and may be supplied to the fuel cell stack. After humidifying the dry gas, the wet gas may be discharged from the hollow fiber membranes 211, and may then be discharged to the outside through the second cap 4. The first cap 3 may be connected to the fuel cell stack such that wet gas is supplied thereto.

Figure 8:
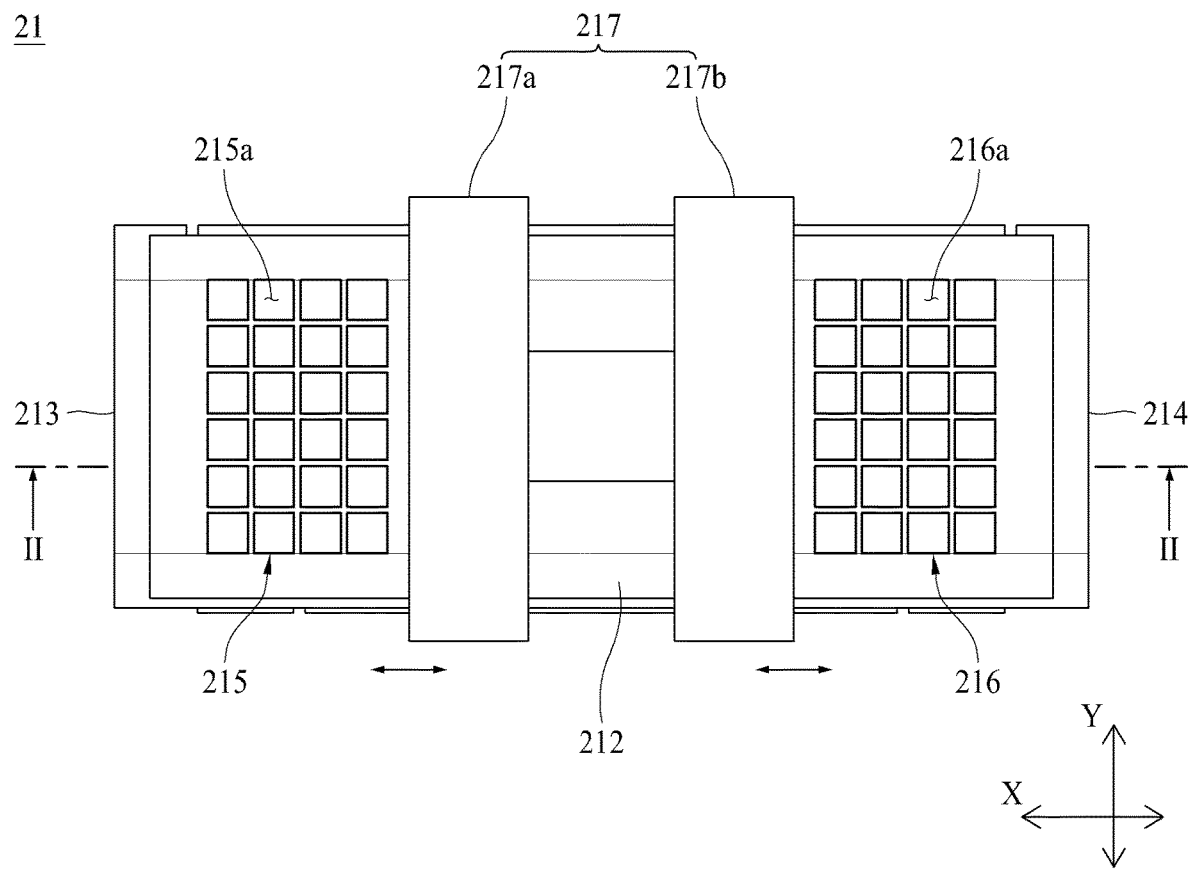
FIG. 8 is a schematic plan view showing the state in which an adjustment cover is coupled to an inner case in the cartridge of the humidifier for fuel cells according to the present disclosure.

Referring to FIGS. 7 and 8, the cartridge 21 may include an adjustment cover 217.

The adjustment cover 217 is configured to adjust at least one of an inflow area and an outflow area. The inflow area, which is the area of a passage into which wet gas or dry gas is introduced through the gas inlet 215, is the remainder of the total area of the gas inlet 215 excluding an area covered by the adjustment cover 217. The outflow area, which is the area of a passage from which wet gas or dry gas is discharged through the gas outlet 216, is the remainder of the total area of the gas outlet 216 excluding an area covered by the adjustment cover 217.

The adjustment cover 217 may be movably coupled to the inner case 212. The area that covers at least one of the gas inlet 215 and the gas outlet 216 may be adjusted by movement of the adjustment cover 217, whereby at least one of the inflow area and the outflow area may be adjusted.

For example, when the adjustment cover 217 moves such that the area that covers the gas inlet 215 is increased, the inflow area may be decreased. As a result, the inflow rate per unit time of wet gas or dry gas introduced into the inner case 212 through the gas inlet 215 may be decreased, whereby humidification performance of the cartridge 21 may be adjusted.

For example, when the adjustment cover 217 moves such that the area that covers the gas inlet 215 is decreased, the inflow area may be increased. As a result, the inflow rate per unit time of wet gas or dry gas introduced into the inner case 212 through the gas inlet 215 may be increased, whereby humidification performance of the cartridge 21 may be adjusted.

As described above, the humidifier 1 for fuel cells according to the present disclosure is implemented such that the area that covers the gas inlet 215 is adjusted using the adjustment cover 217, whereby the inflow area is adjusted, and therefore humidification performance of the cartridge 21 is adjusted. Consequently, the humidifier 1 for fuel cells according to the present disclosure may be implemented so as to have humidification performance suitable for a fuel cell used at a place of use.

For example, when the adjustment cover 217 moves such that the area that covers the gas outlet 216 is increased, the outflow area may be decreased. As a result, the outflow rate per unit time of wet gas or dry gas discharged from the inner case 212 through the gas outlet 216 may be decreased, whereby humidification performance of the cartridge 21 may be adjusted.

For example, when the adjustment cover 217 moves such that the area that covers the gas outlet 216 is decreased, the outflow area may be increased. As a result, the outflow rate per unit time of wet gas or dry gas discharged from the inner case 212 through the gas outlet 216 may be increased, whereby humidification performance of the cartridge 21 may be adjusted.

As described above, the humidifier 1 for fuel cells according to the present disclosure is implemented such that the area that covers the gas outlet 216 is adjusted using the adjustment cover 217, whereby the outflow area is adjusted, and therefore humidification performance of the cartridge 21 is adjusted. Consequently, the humidifier 1 for fuel cells according to the present disclosure may be implemented so as to have humidification performance suitable for a fuel cell used at a place of use.

The adjustment cover 217 may adjust the inflow area and the outflow area so as to be different from each other, thereby adjusting humidification performance of the cartridge 21.

For example, when the adjustment cover 217 moves such that the area that covers the gas inlet 215 is decreased and the area that covers the gas outlet 216 is increased, the inflow area may become greater than the outflow area. Even when the adjustment cover 217 increases the area that covers the gas outlet 216 while not changing the area that covers the gas inlet 215 and even when the adjustment cover 217 decreases the area that covers the gas inlet 215 while not changing the area that covers the gas outlet 216, the inflow area may become greater than the outflow area. When the inflow area becomes greater than the outflow area by the adjustment cover 217, as described above, the outflow rate per unit time of wet gas or dry gas discharged from the inner case 212 through the gas outlet 216 may become less than the inflow rate per unit time of wet gas or dry gas introduced into the inner case 212 through the gas inlet 215. As a result, dwell time during which wet gas or dry gas stays in the inner case 212 may be increased, whereby humidification performance of the cartridge 21 may be improved. Consequently, the humidifier 1 for fuel cells according to the present disclosure may be implemented so as to be suitable for a fuel cell used at a place of use that requires high humidification performance.

For example, when the adjustment cover 217 moves such that the area that covers the gas inlet 215 is increased and the area that covers the gas outlet 216 is decreased, the inflow area may become less than the outflow area. Even when the adjustment cover 217 decreases the area that covers the gas outlet 216 while not changing the area that covers the gas inlet 215 and even when the adjustment cover 217 increases the area that covers the gas inlet 215 while not changing the area that covers the gas outlet 216, the inflow area may become less than the outflow area. When the inflow area becomes less than the outflow area by the adjustment cover 217, as described above, the outflow rate per unit time of wet gas or dry gas discharged from the inner case 212 through the gas outlet 216 may become greater than the inflow rate per unit time of wet gas or dry gas introduced into the inner case 212 through the gas inlet 215. As a result, dwell time during which wet gas or dry gas stays in the inner case 212 may be decreased, whereby humidification performance of the cartridge 21 may be adjusted so as to be suitable for humidification performance required at a place of use. Consequently, the humidifier 1 for fuel cells according to the present disclosure may be implemented so as to have humidification performance suitable for a fuel cell used at a place of use.

The adjustment cover 217 may be coupled to the inner case 212 so as to be movable in the first axis direction (X-axis direction) while covering one side 2120 of the inner case 212. The adjustment cover 217 may be moved in the first axis direction (X-axis direction) by external force provided by a worker, etc. The adjustment cover 217 may be formed so as to have a size sufficient to cover the entirety of the gas inlet 215. The adjustment cover 217 may be formed so as to have a size sufficient to cover the entirety of the gas outlet 216.

The adjustment cover 217 may adjust the number of the inflow windows 215a of the gas inlet 215 that are covered, thereby adjusting the inflow area. The adjustment cover 217 may adjust the number of the outflow windows 216a of the gas outlet 216 that are covered, thereby adjusting the outflow area.

The adjustment cover 217 may include an inflow cover 217a. The inflow cover 217a may adjust the area that covers the gas inlet 215, thereby adjusting the inflow area. The inflow cover 217a may adjust the number of the inflow windows 215a of the gas inlet 215 that are covered, thereby adjusting the inflow area. The inflow cover 217a may be movably coupled to the inner case 212.

The adjustment cover 217 may include an outflow cover 217b. The outflow cover 217b may adjust the area that covers the gas outlet 216, thereby adjusting the outflow area. The outflow cover 217b may adjust the number of the outflow windows 216a of the gas outlet 216 that are covered, thereby adjusting the outflow area. The outflow cover 217b may be movably coupled to the inner case 212.

The adjustment cover 217 may include only the inflow cover 217a, or may include only the outflow cover 217b. The adjustment cover 217 may include both the inflow cover 217a and the outflow cover 217b. That is, the adjustment cover 217 may include at least one of the inflow cover 217a and the outflow cover 217b.

Figure 10:
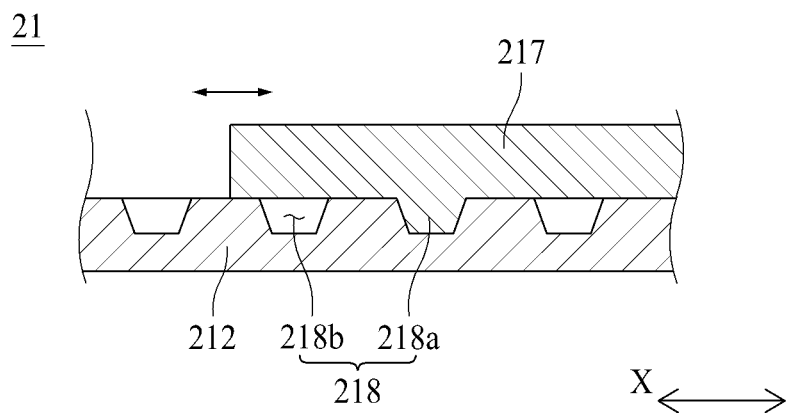
FIGS. 10 to 12 are schematic side sectional views showing embodiments of a restriction unit in the cartridge of the humidifier for fuel cells according to the present disclosure, taken along line III-III of FIG. 8.
Figure 11:
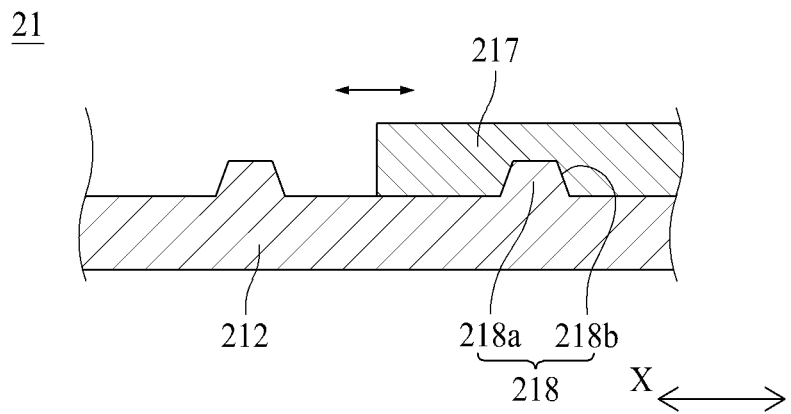
Figure 12:
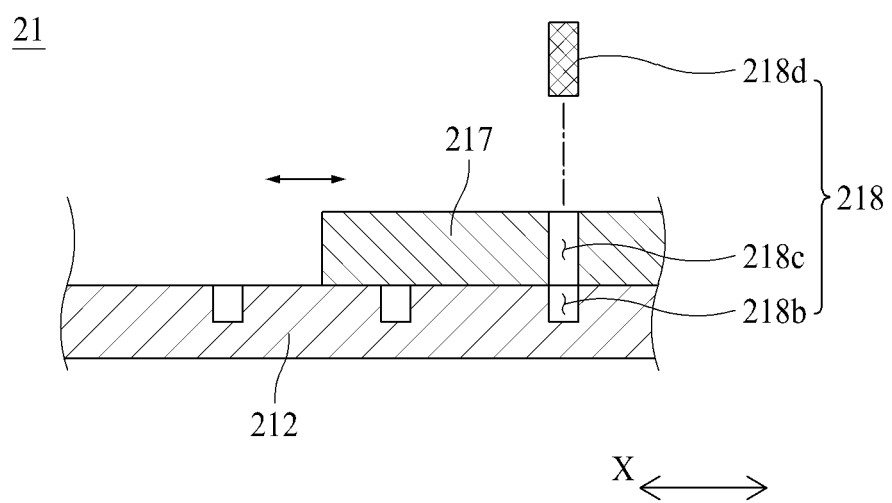

Referring to FIGS. 10 to 12, the cartridge 21 may include a restriction unit 218.

The restriction unit 218 is configured to restrict movement of the adjustment cover 217. Since movement of the adjustment cover 217 is restricted by the restriction unit 218, the adjustment cover 217 of the humidifier 1 for fuel cells according to the present disclosure may be prevented from being arbitrarily moved by external force generated due to vibration, shaking, etc. In the humidifier 1 for fuel cells according to the present disclosure, therefore, at least one of the inflow area and the outflow area may be securely maintained in a state of being adjusted by the adjustment cover 217, whereby humidification performance of the humidifier may be maintained at humidification performance suitable for a fuel cell used at a place of use. The restriction unit 218 may allow the adjustment cover 217 to be moved by external force provided by the worker, etc., and may restrict the adjustment cover 217 so as not to be moved by external force generated by vibration, shaking, etc. smaller than the external force provided by the worker, etc. When the adjustment cover 217 includes both the inflow cover 217a and the outflow cover 217b, the restriction unit 218 may be applied to each of the inflow cover 217a and the outflow cover 217b.

Here, the restriction unit 218 may be implemented so as to have various embodiments depending on the structure thereof. Hereinafter, embodiments of the restriction unit 218 will be sequentially described with reference to the accompanying drawings.

Referring to FIG. 10, the restriction unit 218 may include a restriction protrusion 218a and a plurality of restriction grooves 218b.

The restriction protrusion 218a may protrude from the adjustment cover 217. The restriction protrusion 218a may protrude from one surface of the adjustment cover 217 toward the inner case 212. Based on FIG. 10, one surface of the adjustment cover 217 may correspond to a lower surface of the adjustment cover 217.

The restriction protrusion 218a may be inserted into any one of the restriction grooves 218b to restrict movement of the adjustment cover 217. Consequently, it is possible for the restriction unit 218 to prevent the adjustment cover 217 from being arbitrarily moved by external force generated due to vibration, shaking, etc. The restriction protrusion 218a may be formed so as to have a size gradually reduced with increasing protrusion distance from the adjustment cover 217. Consequently, the restriction protrusion 218a may be implemented so as to allow the adjustment cover 217 to be smoothly moved by external force provided by the worker, etc. while preventing the adjustment cover 217 from being arbitrarily moved by external force generated due to vibration, shaking, etc. For example, as shown in FIG. 10, the restriction protrusion 218a may be formed so as to have a trapezoidal section with a size gradually reduced with increasing protrusion distance from the adjustment cover 217. Although not shown, the restriction protrusion 218a may be formed so as to have a semicircular section with a size gradually reduced with increasing protrusion distance from the adjustment cover 217.

The restriction grooves 218b are formed in the inner case 212. The restriction grooves 218b may be disposed spaced apart from each other in a movement direction of the adjustment cover 217. With movement of the adjustment cover 217, therefore, the restriction groove 218b into which the restriction protrusion 218a is inserted may be changed. Each of the restriction grooves 218b may be formed so as to have a shape that is complementary to the restriction protrusion 218a.

The restriction grooves 218b may be formed in one surface of the inner case 212 that faces the adjustment cover 217. Based on FIG. 10, one surface of the inner case 212 may correspond to an upper surface of the inner case 212. The restriction grooves 218b may be formed by forming grooves in an outer surface of the inner case 212.

Referring to FIG. 11, the restriction unit 218 may include a plurality of restriction protrusions 218a and a restriction groove 218b.

The restriction protrusions 218a may protrude from the inner case 212. The restriction protrusions 218a may protrude from one surface of the inner case 212 toward the adjustment cover 217. Based on FIG. 11, one surface of the inner case 212 may correspond to an upper surface of the inner case 212.

Any one of the restriction protrusions 218a may be inserted into the restriction groove 218b to restrict movement of the adjustment cover 217. Consequently, it is possible for the restriction unit 218 to prevent the adjustment cover 217 from being arbitrarily moved by external force generated due to vibration, shaking, etc. Each of the restriction protrusions 218a may be formed so as to have a size gradually reduced with increasing protrusion distance from the inner case 212. Consequently, the restriction protrusions 218a may be implemented so as to allow the adjustment cover 217 to be smoothly moved by external force provided by the worker, etc. while preventing the adjustment cover 217 from being arbitrarily moved by external force generated due to vibration, shaking, etc. For example, as shown in FIG. 11, each of the restriction protrusions 218a may be formed so as to have a trapezoidal section with a size gradually reduced with increasing protrusion distance from the inner case 212. Although not shown, each of the restriction protrusions 218a may be formed so as to have a semicircular section with a size gradually reduced with increasing protrusion distance from the inner case 212.

The restriction protrusions 218a may be disposed spaced apart from each other in the movement direction of the adjustment cover 217. With movement of the adjustment cover 217, therefore, the restriction protrusion 218a that is inserted into the restriction groove 218b may be changed.

The restriction groove 218b is formed in the adjustment cover 217. The restriction groove 218b may be formed in one surface of the adjustment cover 217 that faces the inner case 212. Based on FIG. 11, one surface of the adjustment cover 217 may correspond to a lower surface of the adjustment cover 217. The restriction groove 218b may be formed by forming a groove in the lower surface of the adjustment cover 217. The restriction groove 218b may be formed so as to have a shape that is complementary to each of the restriction protrusions 218a.

Referring to FIG. 12, the restriction unit 218 may include a plurality of restriction grooves 218b, a restriction hole 218c, and a restriction member 218d.

The restriction grooves 218b are formed in the inner case 212. The restriction grooves 218b may be disposed spaced apart from each other in the movement direction of the adjustment cover 217. The restriction grooves 218b may be formed in one surface of the inner case 212 that faces the adjustment cover 217. Based on FIG. 12, one surface of the inner case 212 may correspond to an upper surface of the inner case 212. The restriction grooves 218b may be formed by forming grooves in an outer surface of the inner case 212.

The restriction hole 218c is formed in the adjustment cover 217. The restriction hole 218c may be formed through the adjustment cover 217. With movement of the adjustment cover 217, the restriction hole 218c may be connected to any one of the restriction grooves 218b. Consequently, the restriction groove 218b into which the restriction member 218d is inserted may be changed.

The restriction member 218d is detachably coupled to the adjustment cover 217 and the inner case 212. The restriction member 218d may be inserted into any one of the restriction grooves 218b and the restriction hole 218c to restrict movement of the adjustment cover 217. Consequently, it is possible for the restriction unit 218 to prevent the adjustment cover 217 from being arbitrarily moved by external force generated due to vibration, shaking, etc. The restriction member 218d may be inserted into the restriction groove 218b disposed so as to be connected to the restriction hole 218c, among the restriction grooves 218b, and the restriction hole 218c.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein
the humidifying module comprises:
a mid-case open at opposite ends thereof; and
at least one cartridge disposed in the mid-case, the cartridge comprising a plurality of hollow fiber membranes,
the cartridge comprises an inner case having openings formed in ends thereof, the inner case being configured to receive the plurality of hollow fiber membranes, and a restriction unit,
the inner case comprises a gas inlet configured to allow wet gas or dry gas to be introduced therethrough and a gas outlet configured to allow wet gas or dry gas to be discharged therethrough, and
an adjustment cover configured to adjust at least one of an inflow area, which is an area of wet gas or dry gas introduced through the gas inlet, and an outflow area, which is an area of wet gas or dry gas discharged through the gas outlet, is movably coupled to the inner case,
wherein the restriction unit is configured to restrict movement of the adjustment cover,
wherein the restriction unit comprises a restriction protrusion protruding from the adjustment cover and a plurality of restriction grooves formed in the inner case, the restriction grooves are spaced apart from each other in a movement direction of the
adjustment cover, and the restriction protrusion is inserted into any one of the restriction grooves, whereby the movement of the adjustment cover is restricted.

2. The humidifier according to claim 1, wherein the adjustment cover adjusts the inflow area and the outflow area so as to be different from each other.

3. The humidifier according to claim 1, wherein
the gas inlet comprises a plurality of inflow windows formed through the inner case, and
the adjustment cover comprises an inflow cover configured to adjust the number of the inflow windows that are covered, thereby adjusting the inflow area.

4. The humidifier according to claim 1, wherein
the gas outlet comprises a plurality of outflow windows formed through the inner case, and
the adjustment cover comprises an outflow cover configured to adjust the number of the outflow windows that are covered, thereby adjusting the outflow area.

5. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein
the humidifying module comprises:
a mid-case open at opposite ends thereof; and at least one cartridge disposed in the mid-case, the cartridge comprising a plurality of hollow fiber membranes, the cartridge comprises an inner case having openings formed in ends thereof, the inner case being configured to receive the plurality of hollow fiber membranes, and a restriction unit, the inner case comprises a gas inlet configured to allow wet gas or dry gas to be introduced therethrough and a gas outlet configured to allow wet gas or dry gas to be discharged therethrough, and an adjustment cover configured to adjust at least one of an inflow area, which is an area of wet gas or dry gas introduced through the gas inlet, and an outflow area, which is an area of wet gas or dry gas discharged through the gas outlet, is movably coupled to the inner case, wherein the restriction unit is configured to restrict movement of the adjustment cover, wherein the restriction unit comprises a restriction groove formed in the adjustment cover and a plurality of restriction protrusions protruding from the inner case, the restriction protrusions are spaced apart from each other in a movement direction of the adjustment cover, and any one of the restriction protrusions is inserted into the restriction groove, whereby the movement of the adjustment cover is restricted.

6. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein
the humidifying module comprises:
a mid-case open at opposite ends thereof; and
at least one cartridge disposed in the mid-case, the cartridge comprising a plurality of hollow fiber membranes, the cartridge comprises an inner case having openings formed in ends thereof, the inner case being configured to receive the plurality of hollow fiber membranes, and a restriction unit, the inner case comprises a gas inlet configured to allow wet gas or dry gas to be introduced therethrough and a gas outlet configured to allow wet gas or dry gas to be discharged therethrough, and an adjustment cover configured to adjust at least one of an inflow area, which is an area of wet gas or dry gas introduced through the gas inlet, and an outflow area, which is an area of wet gas or dry gas discharged through the gas outlet, is movably coupled to the inner case, wherein the restriction unit is configured to restrict movement of the adjustment cover, wherein the restriction unit comprises a restriction hole formed through the adjustment cover, a plurality of restriction grooves formed in the inner case, and a restriction member detachably coupled to the adjustment cover and the inner case, the restriction grooves are spaced apart from each other in a movement direction of the adjustment cover, and the restriction member is inserted into any one of the restriction grooves and the restriction hole, whereby the movement of the adjustment cover is restricted.

7. A cartridge of a humidifier for fuel cells configured to humidify dry gas supplied from outside using wet gas discharged from a fuel cell stack, the cartridge comprising:
an inner case having openings formed in ends thereof, the inner case being configured to receive a plurality of hollow fiber membranes;
a gas inlet and a gas outlet formed in the inner case;
an adjustment cover movably coupled to the inner case, the adjustment cover being configured to adjust at least one of an inflow area, which is an area of wet gas or dry gas introduced through the gas inlet, and an outflow area, which is an area of wet gas or dry gas discharged through the gas outlet; and
a restriction unit configured to restrict movement of the adjustment cover,
wherein the restriction unit comprises a restriction protrusion protruding from the adjustment cover and a plurality of restriction grooves formed in the inner case,
the restriction grooves are spaced apart from each other in a movement direction of the adjustment cover, and
the restriction protrusion is inserted into any one of the restriction grooves, whereby the movement of the adjustment cover is restricted.

8. The cartridge according to claim 7, wherein the adjustment cover adjusts the inflow area and the outflow area so as to be different from each other.

9. The cartridge according to claim 7, wherein
the gas inlet comprises a plurality of inflow windows formed through the inner case, and
the adjustment cover comprises an inflow cover configured to adjust the number of the inflow windows that are covered, thereby adjusting the inflow area.

10. The cartridge according to claim 7, wherein
the gas outlet comprises a plurality of outflow windows formed through the inner case, and
the adjustment cover comprises an outflow cover configured to adjust the number of the outflow windows that are covered, thereby adjusting the outflow area.

11. A cartridge of a humidifier for fuel cells configured to humidify dry gas supplied from outside using wet gas discharged from a fuel cell stack, the cartridge comprising:
an inner case having openings formed in ends thereof, the inner case being configured to receive a plurality of hollow fiber membranes;
a gas inlet and a gas outlet formed in the inner case;
an adjustment cover movably coupled to the inner case, the adjustment cover being configured to adjust at least one of an inflow area, which is an area of wet gas or dry gas introduced through the gas inlet, and an outflow area, which is an area of wet gas or dry gas discharged through the gas outlet; and
a restriction unit configured to restrict movement of the adjustment cover,
wherein the restriction unit comprises a restriction groove formed in the adjustment cover and a plurality of restriction protrusions protruding from the inner case,
the restriction protrusions are spaced apart from each other in a movement direction of the adjustment cover, and
any one of the restriction protrusions is inserted into the restriction groove, whereby the movement of the adjustment cover is restricted.

12. A cartridge of a humidifier for fuel cells configured to humidify dry gas supplied from outside using wet gas discharged from a fuel cell stack, the cartridge comprising:

an inner case having openings formed in ends thereof, the inner case being configured to receive a plurality of hollow fiber membranes;

a gas inlet and a gas outlet formed in the inner case;

an adjustment cover movably coupled to the inner case, the adjustment cover being configured to adjust at least one of an inflow area, which is an area of wet gas or dry gas introduced through the gas inlet, and an outflow area, which is an area of wet gas or dry gas discharged through the gas outlet; and a restriction unit configured to restrict movement of the adjustment cover, wherein the restriction unit comprises a restriction hole formed through the adjustment cover, a plurality of restriction grooves formed in the inner case, and a restriction member detachably coupled to the adjustment cover and the inner case, the restriction grooves are spaced apart from each other in a movement direction of the adjustment cover, and the restriction member is inserted into any one of the restriction grooves and the restriction hole, whereby the movement of the adjustment cover is restricted.

\* \* \* \* \*